US007962782B2

(12) United States Patent
Barghouthi et al.

(10) Patent No.: US 7,962,782 B2
(45) Date of Patent: Jun. 14, 2011

(54) MODIFYING CONNECTION RECORDS

(75) Inventors: Soloman J. Barghouthi, Rochester, MN (US); Sherry Guo, Fremont, CA (US); Bilung Lee, Fremont, CA (US); Paul Arnold Ostler, Yakima, WA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/123,948

(22) Filed: May 20, 2008

(65) Prior Publication Data

US 2009/0292953 A1    Nov. 26, 2009

(51) Int. Cl.
*G06F 11/00* (2006.01)
(52) U.S. Cl. .................................... 714/7; 714/8; 714/9
(58) Field of Classification Search .................. 714/6, 7, 714/8, 9
See application file for complete search history.

(56) References Cited

U.S. PATENT DOCUMENTS

| 6,038,212 | A | 3/2000 | Galand et al. |
| 6,173,311 | B1 * | 1/2001 | Hassett et al. ................ 709/202 |
| 6,411,956 | B1 | 6/2002 | Ng |
| 6,486,983 | B1 | 11/2002 | Beshai et al. |
| 6,857,026 | B1 | 2/2005 | Cain |
| 6,928,580 | B2 * | 8/2005 | Pedone et al. ..................... 714/7 |
| 7,089,448 | B2 * | 8/2006 | Hinshaw et al. .................. 714/6 |
| 7,234,082 | B2 | 6/2007 | Lai et al. |
| 2002/0147807 | A1 | 10/2002 | Raguseo |
| 2003/0074600 | A1 * | 4/2003 | Tamatsu ............................ 714/6 |
| 2004/0120713 | A1 | 6/2004 | Ward et al. |
| 2004/0260899 | A1 | 12/2004 | Kern et al. |
| 2005/0265231 | A1 | 12/2005 | Gunther et al. |
| 2006/0173866 | A1 * | 8/2006 | Newport ........................ 707/100 |
| 2007/0198684 | A1 * | 8/2007 | Mizushima ................... 709/223 |
| 2010/0094988 | A1 | 4/2010 | Chang et al. |

OTHER PUBLICATIONS

Leilei Li et al., IMS Resource Adapter: Web Enabling IMS, Z Journal, Feb./Mar. 2006 (4 pgs).
Wang et al., The Realization of Multiple Connections Per A Call Using RSVP-TE in ASON, Communications and Networking in China 2006, ChinaCom '06, Oct. 2006 (4 pgs).
Hutchison et al., Database Connection Pool Management, DOSS# AAA98A060749, 1998, (7 pgs).
Daggett et al., Method of Establishing Connections In The Client Server Model of Tangora, IBM Technical Disclosure Bulletin, Feb. 1993 (2 pgs).
Botzum et al., IBM WebSphere Developer Technical Journal: Database identity propagation in WebSphere Application Server V6, www.ibm.com/developerworks/websphere/techjournal, Jun. 15, 2005 (23 pgs).

\* cited by examiner

*Primary Examiner* — Joshua A Lohn
(74) *Attorney, Agent, or Firm* — Toler Law Group

(57) ABSTRACT

Systems and methods to modify a set of connection records are described. A determination is made that an application failed to access a first database via a connection record, where the connection record includes data to access the first database. A determination is made that a second database is accessible, where the second database is a failover database to the first database. A set of connection records associated with the first database is modified to enable access to the second database.

18 Claims, 7 Drawing Sheets

MODIFYING CONNECTION RECORDS

I. FIELD

The present disclosure is generally related to modifying connection records.

II. BACKGROUND

When a software application requires access to a database, the software application may request a connection record to the database from an application server via a database driver. The connection record provides the software application with the information needed to access the database, such as the address of the database and the protocol used to access the database. The application server expends time and computing resources to establish a connection to a database and to create a connection record to the database. To reduce the time needed to provide the application a connection record to the database, the application server may maintain a pool of connection records. The pool may include connection records to more than one database. For example, the pool may include a set of connections associated with several databases.

One problem with using a pool of connection records is that when a database is inaccessible, the set of connection records to the inaccessible database in the connection pool become stale because the connection records may no longer be used to connect to the inaccessible database. One way of handling stale connection records is to purge the set of connection records associated with the inaccessible database from the connection pool and create a new set of connection records to a failover or backup database to the inaccessible database.

III. BRIEF SUMMARY

A system and method to modify a set of connection records is disclosed. In a particular embodiment, the method determines that that an application failed to access a first database via a connection record, where the connection record includes parameters to access the first database. A determination is made that a second database is accessible, where the second database is a failover database to the first database. A set of connection records associated with the first database is modified to enable access to the second database.

The connection record to enable access to the second database may be modified before modifying the set of connection records. Modifying the connection record may enable the application to continue processing substantially without interruption. The set of connection records may be modified to enable access to the second database in response to determining that the application failed to access the first database via the connection record. Modifying each connection record of the set of connection records to enable access to the second database may be performed substantially concurrently.

Before modifying the set of connection records to enable access to the second database, at least one connection record in the set of connection records may be identified as not currently in use. At least one connection record of the set of connection records may be identified that was not successfully modified to enable access to the second database and the at least one connection record may be deleted.

IV. BRIEF DESCRIPTION OF THE DRAWINGS

V. DETAILED DESCRIPTION

Figure 1:
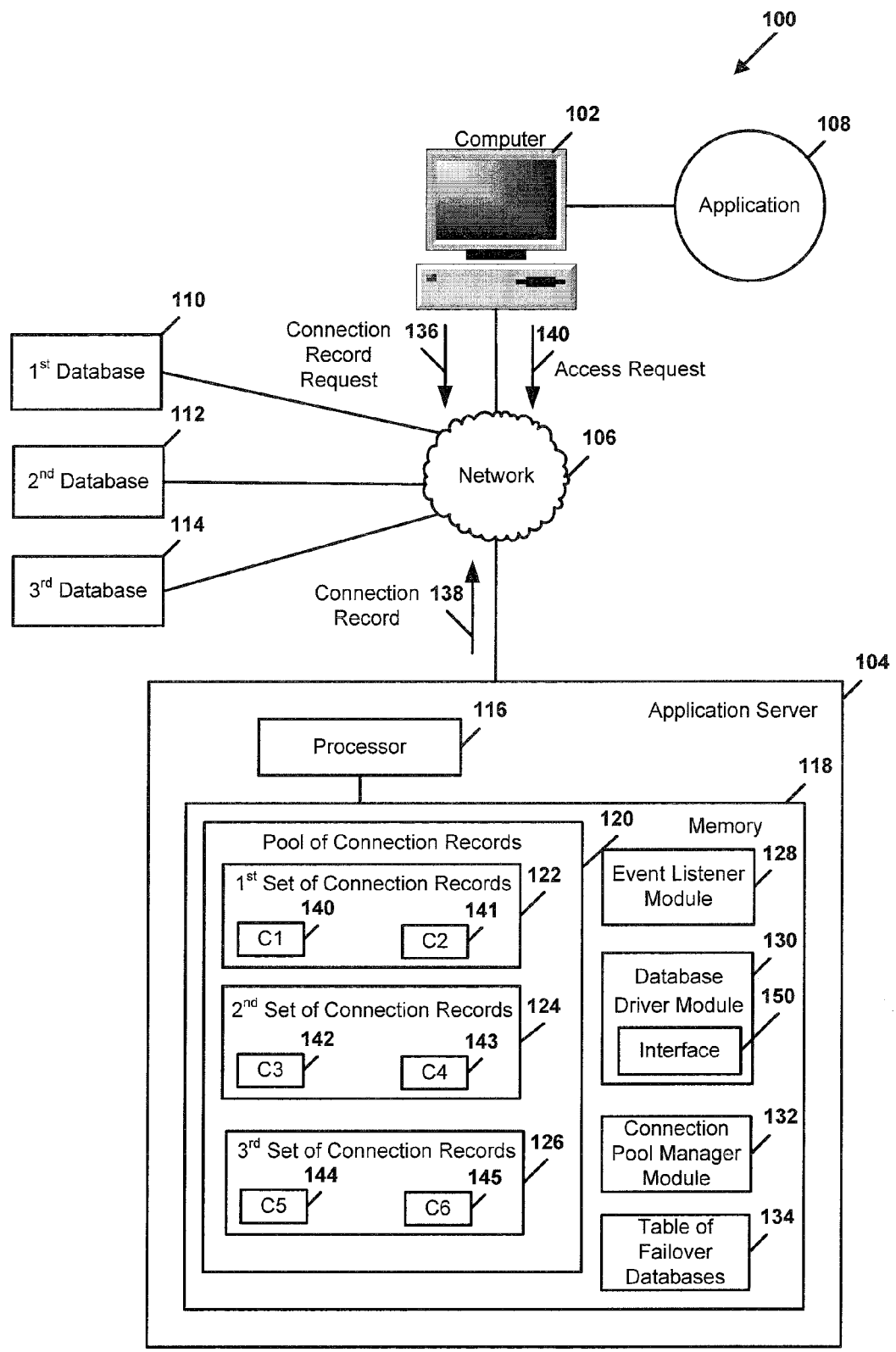
FIG. 1 is a block diagram of a first embodiment of a system to modify connection records.

FIG. 1 is a block diagram of a particular embodiment of a system 100 to modify connection records. The system 100 includes a computer 102 coupled to an application server 104 via a network 106. An application 108 may be a software process running on the computer 102. The application server 104 is also coupled to a first database 110, a second database 112, and a third database 114 via the network 106.

The computer 102 may be a personal computing device, a server, or a mobile computing device, such as a hand-held computing device, a mobile phone, or a laptop computer. The computer 102 includes hardware (not shown) and an operating system (not shown) adapted to run software applications, such as the application 108. The network 106 may include a local area network, a wide area network, an Internet Protocol network, a wireless network, a wireline network, or any combination thereof.

The application server 104 may be adapted to provide the application 108 with access to the first database 110, the second database 112, and the third database 114. The application server 104 includes a processor 116 and a memory 118. The memory 118 includes a pool of connection records 120. The pool of connection records 120 includes a first set of connection records 122, a second set of connection records 124, and a third set of connection records 126. Each set of connection records 122, 124, and 126 may include one or more connection records, such as the representative connection records C1 140, C2 141, C3 142, C4 143, C5 144, and C6 145.

The connection records 140-145 in the pool of connection records 120 may include data to enable the application 108 to access a specific database, such as the first database 110, the second database 112, or the third database 114. For example, a connection record in the pool of connection records 120 may include an address of a specific database, a type of protocol for accessing the database, and other information associated with accessing the database.

The application server 104 may maintain the sets of connection records 122, 124, and 126 to each database 110, 112, and 114 to enable the application server 104 to quickly provide the application 108 with information and/or parameters to access the databases 110-114. Each connection record 140-145 in the pool of connection records 120 may be associated with a database 110, 112 and 114 so that each set of connection records 122, 124, and 126 may be used to access a database 110, 112, and 114. For example, the first set of connection records 122 may include one or more connection records 140-141 to enable access to the first database 110, the second set of connection records 124 may include one or more connection records 142-144 to enable access to the second database 112, and the third set of connection records 126 may include one or more connection records 145-146 to enable access to the third database 126.

The memory 118 may also includes various modules that are executable by the processor to perform the functions of the application server 104. The various modules may be implemented as hardware, software, firmware, other logic instructions, or any combination thereof. As illustrated, the memory 118 includes an event listener module 128, a database driver module 130, a connection pool manager module 132, and a table of failover databases 134.

The database driver module 130 may be adapted to receive a connection record request 136 from the application 108. For example, the connection record request 136 may request the database driver module 130 to send a connection record 138 associated with the first database 110. The database driver module 130 may be further adapted to send the connection record 138 to the application 108 in response to the connection record request 136. One or more connection records in the pool of connection records 120 may remain idle, i.e. inactive, until activated by the application 108. For example, when the connection record 138 is "handed out" to the application 108, i.e. first sent to the application 108, the connection record 138 is initially idle. When the application 108 uses the connection record 138 to access the first database 110, the connection record 138 may transition from an idle state to an "in use" state, also known as an active state.

The database driver module 130 may be further adapted to process an access request 140, such as to access the first database 110 via the connection record 138. The database driver module 130 may determine when an application, such as the application 108, has failed to access a database via a connection record and may reroute the connection record to a failover database. For example, a failover database may be a database that contains substantially the same contents as the first database 110. The failover database may be enabled for access by the application 108 when the first database 110 becomes inaccessible. The failover database of the first database 110 may be a backup database, a redundant database, or a mirrored database of the first database 110. For example, when the database driver module 130 determines that the application 108 has failed to access the first database 110 via the connection record 138, the database driver module 130 may attempt to reroute the connection record 138 to a failover database. The database driver module 130 may determine whether a failover database, such as the second database 112, is accessible, and may modify the connection record 138 to enable access to the second database 112. Modifying the connection record 138 to enable access to the second database 112 may enable the application 108 to continue processing substantially without interruption. The database driver module 130 may also send a message to the event listener module 128 to indicate that the connection record 138 was rerouted.

The database driver module 130 may be configured to send or broadcast a message indicating events that have been detected. An event may be an occurrence of a specific condition, such as an error condition. For example, a reroute event occurs when the database driver module 130 modifies the connection record 138 to enable access to the second database 112, because the database driver module 130 has effectively rerouted the connection record 138 from the first database 110 to the second database 112. When such a reroute event occurs, the database driver module 130 may send or broadcast a message indicating that a reroute event occurred.

The event listener module 128 may be adapted to receive messages, such as the message from the database driver module 130, and to identify an occurrence of specific events based on the messages. For example, when the event listener module 128 receives a message that a reroute event has occurred, the event listener module 128 identifies that a reroute event has occurred based on the message. The event listener module 128 may identify one or more of the modules 128-134 to be notified when a particular event occurs and may send a notification to the identified modules 128-134 that the event has occurred. For example, when the connection pool manager module 132 registers with the event listener module 128 for a particular event, such as a connection record reroute, the event listener module 128 sends a notification to the connection pool manager module 132 when the particular event has occurred.

The connection pool manager 132 is adapted to register with the event listener module 132 to receive notifications of reroute events and to identify a set of connection records associated with the reroute event. For example, when the connection pool manager 132 receives a notification event that the connection record 138 to the first database 110 has been rerouted, the connection pool manager 132 may identify that the first set of connection records 122 are associated with the first database 110. The connection pool manager 132 may send a mass reroute request to the database driver module 130 via an interface 150 to modify the first set of connection records 122 to enable access to the second database 112 after the connection record 138 is modified to enable access to the second database 112.

The table of failover databases 134 may store information about failover databases. For example, the second database 112 may be a failover database to the first database 110 when the contents of the second database 112 can be used as a substitute for the contents of the first database 110. To illustrate, the second database 112 may be a backup, a mirror, or a disk that belongs to a redundant array of inexpensive disks (RAID) configuration. When a connection record cannot be used to access a primary database, such as the first database 110, the database driver module 130 may access the table of failover databases 134 to determine a failover database, such as the second database 112. The database driver module 130 may reroute the connection record to enable access to the second database 112.

In operation, in a particular embodiment, prior to accessing the first database 110, the application 108 sends to the application server 104 a connection record request 136 to obtain a connection record to enable access to the first database 110. The application server 104 sends the connection record 138 to the application 108 in response to the connection record request 136. The application 108 accesses the first database 110 via the connection record 138. When the application server 104 detects that the application 108 has failed to access the first database 110 via the connection record 138, the application server 104 selects a failover database, such as the second database 112, from the table of failover databases 134. The application server 104 then modifies the connection record 138 to enable access to the second database 112.

When the application 108 fails to access the first database 110 via the connection record 138, the first set of connection records 122 become stale because they may no longer be used to access the first database 110. Instead of purging the first set of connection records 122 from the connection pool, the application server 104 identifies connection records associated with the first database 110 from the pool of connection records 120 and attempts to modify each of the identified connection records to enable access to the second database 112. Thus, each of the connection records 140-141 in the first set of connection records 122 may be modified to enable access to the second database 112 in response to determining that the application 108 failed to access the first database 110 via the connection record 138. For example, when the first set of connection records 122 is associated with the first database 110, the application server 104 modifies the first set of connection records 122 to enable access to the second database 112. Modifying each of the connection records 140-141 of the first set of connection records 122 to enable access to the second database 112 may be performed substantially concurrently. Before modifying the first set of connection records 122 to enable access to the second database 112, at least one of the connection records 140-141 in the first set of connection records 122 may be identified as not currently in use, i.e. may be identified as idle or inactive.

The application server 104 may delete the connection records which could not be successfully modified from the pool of connection records 120. For example, when the application server 104 is unable to modify any connection record in the first set of connection records 122 to enable access to the second database 112, the application server 104 deletes the first set of connection records 122. In another example, when the first set of connection records 122 has twelve connection records associated with the first database 110 and the application server 104 is only able to modify five of the connection records to enable access to the second database 112, the application server 104 deletes the seven connection records which were not successfully modified to enable access to the second database 112 from the first set of connection records 122. A particular embodiment of an interaction of the modules 128, 130, 132, and 134 to perform various functions of the application server 104 is described in more detail in FIG. 2.

The system 100 provides a client, such as the application 108, with a mass redirect solution to stale connections in a three-tiered model. In a three-tiered model the tiers include a client tier, a middleware tier, and a database tier. For example, in the system 100, the application 108 is at the client tier, the application server 104 is at the middleware tier, and the databases 110, 112, and 114 are at the data tier. The mass redirect solution includes a notification mechanism for a database driver module to notify an application server via an event listener module when a failed connection has been rerouted to an alternate database. The database driver module notifies the application server in scenarios where database maintenance or failures occur and also in scenarios where network glitches occur such that underlying sockets are closed.

In addition, the interface 150 of the database driver module 130 may be used to assist the application server to redirect or reroute existing idle connections in the pool to a new database without going through a complex reroute process for each individual connection. This interface also enables the application server to identify and prune connections that cannot be successfully redirected. Therefore, the application server can facilitate a mass redirect of an entire set of connections via the database driver without incurring costly retries and timeouts and without contaminating the connection pool with stale connections.

By modifying stale connections from the connection pool to enable them to access a failover database, the system 100 may provide improved efficiency and performance over systems that delete stale connections from the connection pool. For example, deleting stale connections may introduce inefficiencies because an application server would have to expend computing resources to repopulate the pool of connection records with connection records to a failover database. In contrast, the system 100 may be more efficient because the stale connections are not purged but instead modified to enable access to the failover database. When the second database 112 is a backup or alternate database to the first database 110, the second database 112 is typically accessed in a manner similar to the first database 110, and therefore stale connections to the first database 110 may be easily modified to enable access to the second database 112 because both databases are accessed in a similar manner.

Figure 2:
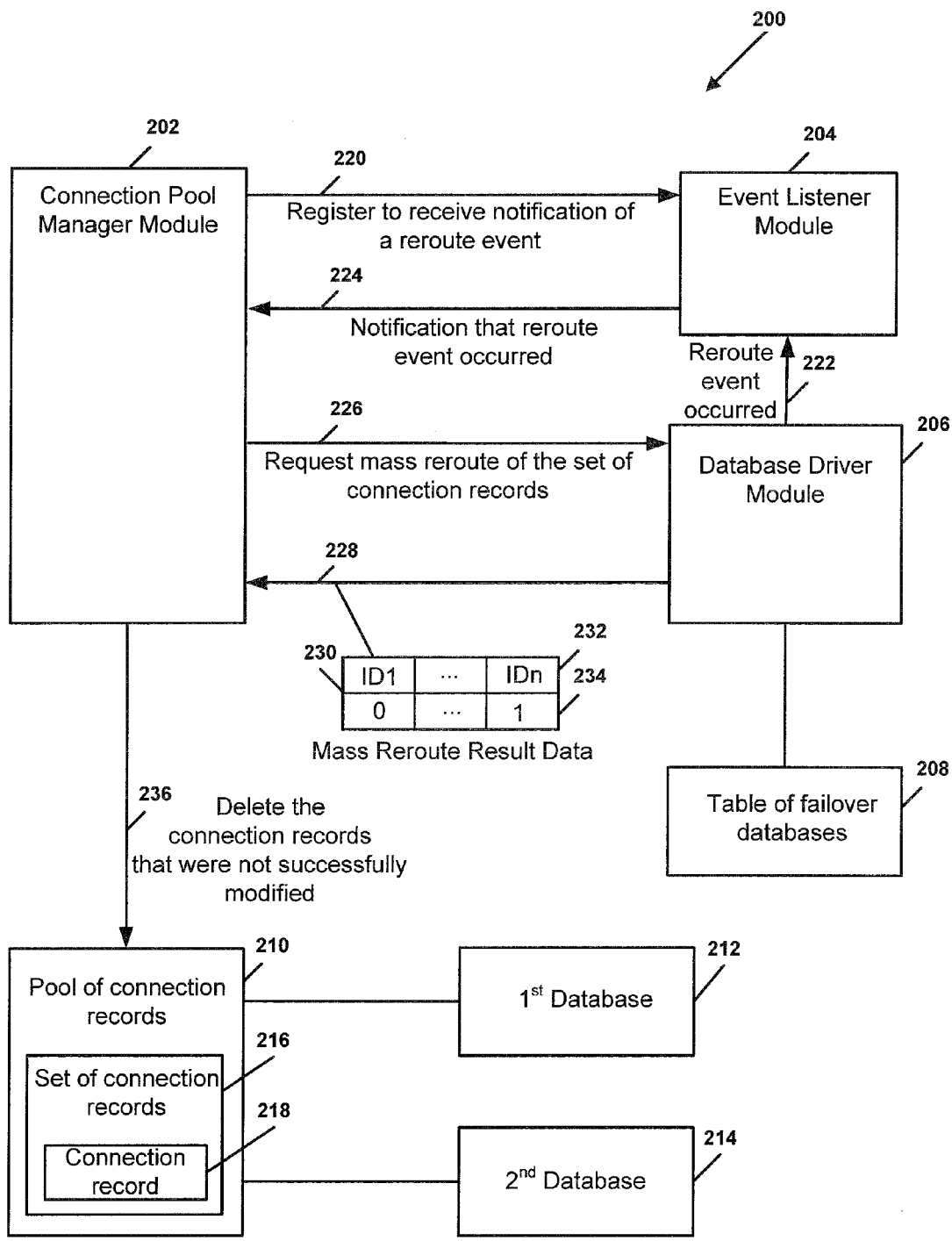
FIG. 2 is a data flow diagram of a second embodiment of a system to modify connection records.

FIG. 2 is a data flow diagram of a particular embodiment of a system 200 to modify connection records to enable access to a failover database. FIG. 2 illustrates how several modules that may be implemented at an application server, such as the application server 104 in FIG. 1, may interact to perform various connection management functions of the application server.

The system 200 includes a connection pool manager module 202, an event listener module 204, a database driver module 206, a table of failover databases 208, a pool of connection records 210, a first database 212, and a second database 214. The pool of connection records 210 includes a set of connection records 216. The set of connection records 216 includes idle connection records maintained to efficiently establish new connections to the first database 212.

As depicted, the connection pool manager module 202 sends a registration message 220 to register with the event listener module 204 to receive a notification of an event. In response to the registration message 220, the event listener module 204 registers the connection pool manager module 202 to receive a notification of a reroute event when a connection record associated with the first database 212 is modified to enable access to the second database 214.

When the database driver module 206 determines that a connection record 218 used to access the first database 212 is no longer able to access the first database 212, the database driver module 206 identifies a failover database from the table of failover databases 208. For example, the database driver module 206 may identify that the second database 214 is a failover database to the first database 212. The database driver module 206 modifies the connection record 218 associated with the first database 212 to enable access to the second database 214. The database driver module 206 sends an event notification message 222 to the event listener module 204 to indicate that a reroute event occurred. The event listener module 204 identifies the modules that are registered to be notified when the reroute event occurs, including the connection pool manager module 202, and the event listener module 204 sends a connection reroute message 224 notifying the connection pool manager 202 that a reroute event occurred.

In response to the connection reroute message 224, the connection pool manager 202 identifies the set of connection records 216 associated with the first database 212 from the pool of connection records 210 and sends a mass reroute request message 226 to the database driver module 206 identifying the set of connection records 216 and requesting a mass reroute of the set of connection records 216. The database driver module 206 attempts to modify each connection record in the set of connection records 216 to enable access to the second database 214. The database driver module 206 sends a reroute result message 228 including mass reroute result data 230 to the connection pool manager 202. The mass reroute result data 230 may include an array of Boolean values indicating which connection records of the set of connection records 216 were successfully modified to enable access to the second database 214. For example, the mass reroute result data 230 may include an identifier (ID) 232 that identifies a connection record of the set of connection records 216 and a value 234 that indicates whether the connection record was successfully modified to enable access to the second database 214.

The connection pool manager module 202 parses the reroute result data 228 to determine which connection records were not successfully modified. The connection pool manager 202 sends a delete instruction 236 to the pool of connection records 210 to delete or purge the connection records which were not successfully modified to enable access to the second database 214.

Thus, the set of connection records 216 are modified to enable access to the second database 214 instead of accessing the first database 212 when a failure to access the first database 212 via a connection record is detected, and stale connection records that could not be modified are removed. By modifying the set of connection records 216 rather than deleting them, the connection pool manager module 202 can efficiently manage the pool of connections records 210 without creating a new set of connection records in response to every reroute event. Modifying the set of connections records 216 enables multiple applications to have access to connection records to a failover database a short time after a primary database fails or is inaccessible. Although the system 200 illustrates a particular embodiment of modifying connection records to enable access to a failover database, other embodiments may include more modules or fewer modules that may communicate with each other in a different arrangement without significantly deviating from the scope of the present disclosure.

Figure 3:
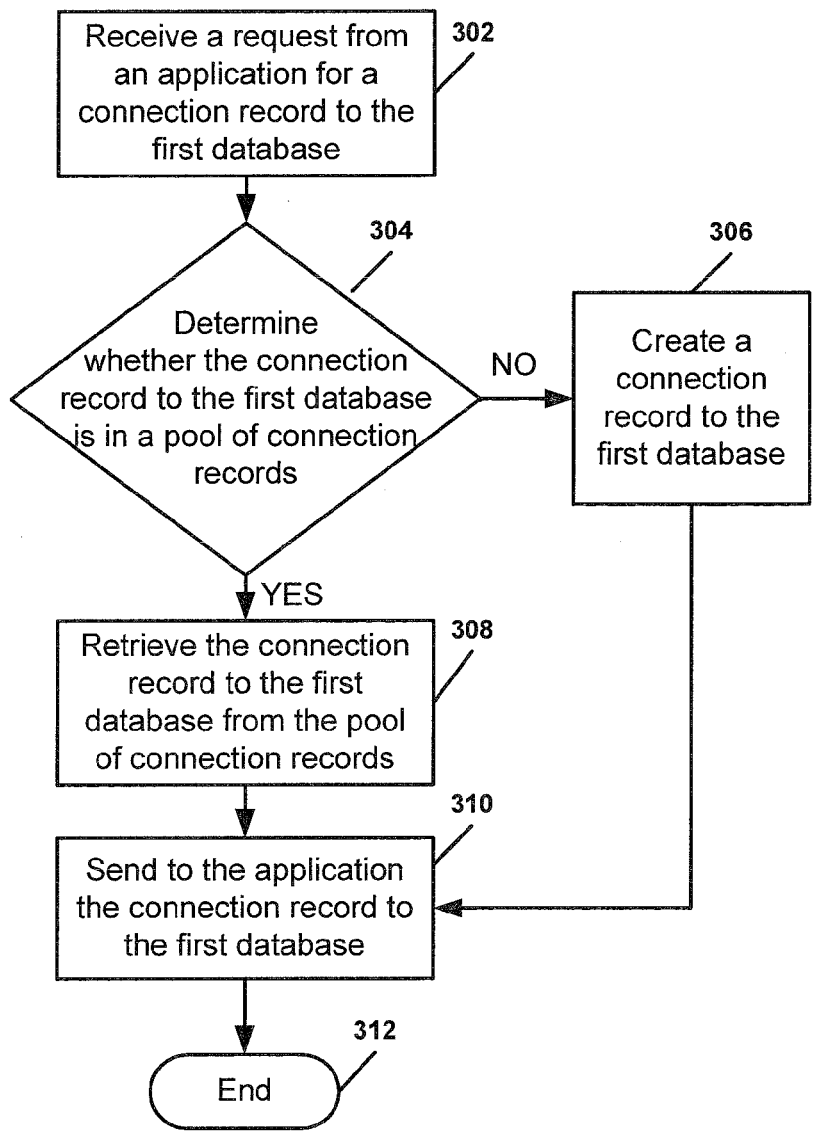
FIG. 3 is a flow diagram of a first illustrative embodiment of a method to modify connection records.

FIG. 3 is a flow diagram of a first illustrative embodiment of a method to modify connection records. The method may be executed by a module, such as the database driver module 130 in FIG. 1, or the database driver module 206 in FIG. 2, that may be implemented as software, firmware, hardware, other form of logic instructions, or any combination thereof. At 302, a request for a connection record to the first database may be received from an application. For example, the request may be the connection record request 136 sent by the application 108 in FIG. 1 to enable the application 108 to access the first database 110 via the connection record 140. Continuing to decision 304, a determination may be made whether the connection record to the first database is in a pool of connection records.

When, at 304, a determination may be made that the connection record to the first database is not in the pool of connection records, then the connection record to the first database may be created and at 306 the method may proceed to 310. For example, when a connection record to the first database 110 of FIG. 1 is not in the pool of connection records 120, the database driver module 130 may create the connection record 140 to the first database 110 at the first set of connection records 122. When a determination is made at 304 that the connection record to the database is in the connection pool, then the connection record to the first database may be retrieved from the connection pool, at 308. At 310, the connection record may be sent to the application. For example, the database driver module 130 of FIG. 1 may retrieve the connection record 138 from the first set of connection records 122 and send the connection record 138 to the application 108 via the network 106. The method may then end at 312.

Figure 4:
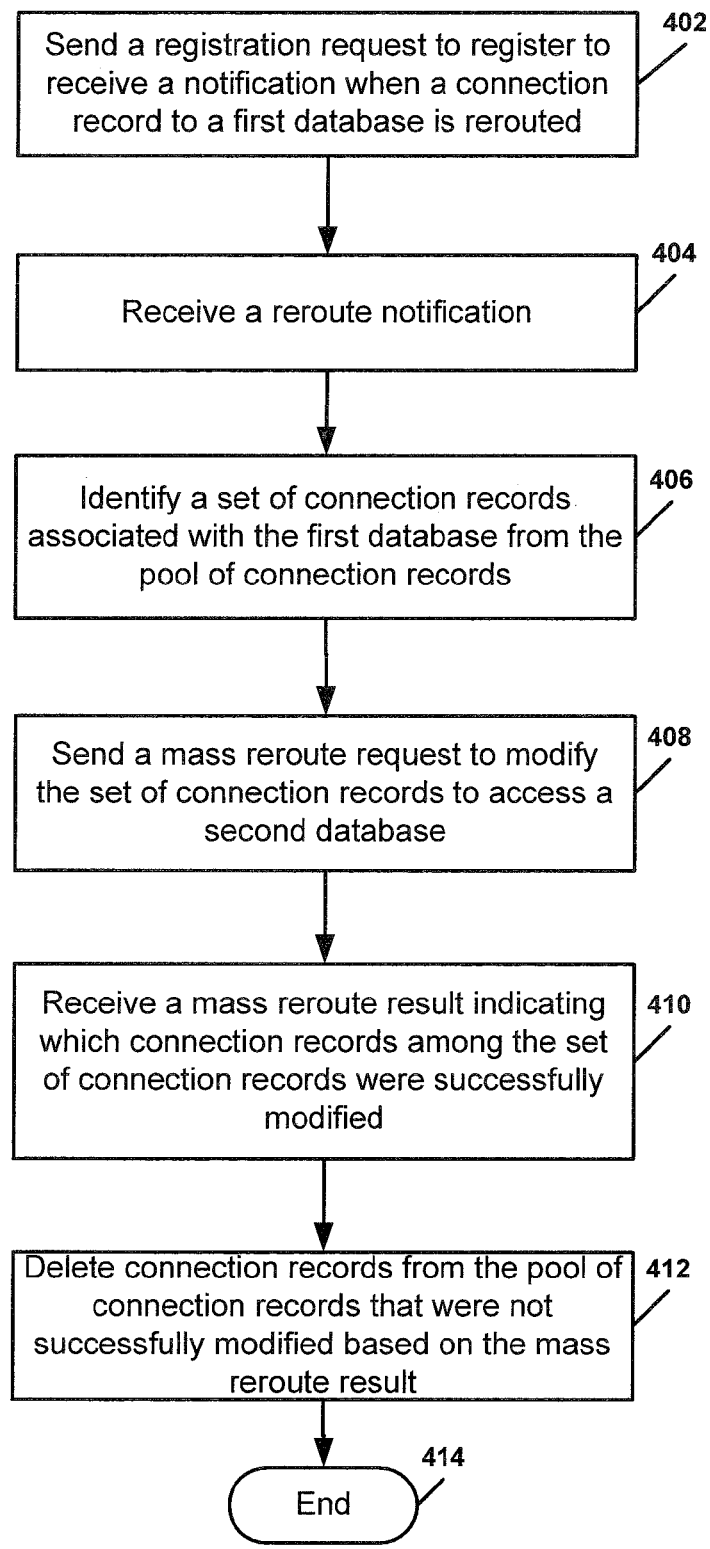
FIG. 4 is a flow diagram of a second illustrative embodiment of a method to modify connection records.

FIG. 4 is a flow diagram of a second illustrative embodiment of a method to modify connection records. The method may be executed by a module, such as the connection pool manager module 132 in FIG. 1 or the connection pool manager module 202 in FIG. 2, and may be implemented as software, firmware, hardware, other form of logic instructions, or any combination thereof.

At 402, a registration request may be sent to register to receive a notification when a connection record to a first database is rerouted. For example, the registration request 220 of FIG. 2 may be sent by the connection pool manager 202 in order to receive a notification when a connection record to the first database 212 is rerouted. Continuing to 404, a reroute notification may be received. The reroute notification may indicate that a connection record to a first database was rerouted to a failover database. Proceeding to 406, a set of connection records associated with the first database may be identified from the pool of connection records. Advancing to 408, a mass reroute request to modify the set of connection records to enable access to a second database may be sent. The second database may be a failover database for the first database, such as a backup or a mirror database. Moving to 410, a mass reroute result may be received indicating which connection records among the set of connection records were successfully modified. Continuing to 412, connection records that were not successfully modified may be deleted from the pool of connection records based on the mass reroute result. For example, the connection records which the reroute result indicates were not successfully modified to enable access to the second database may be deleted from the pool of connection records. The method may end at 414.

Figure 5:
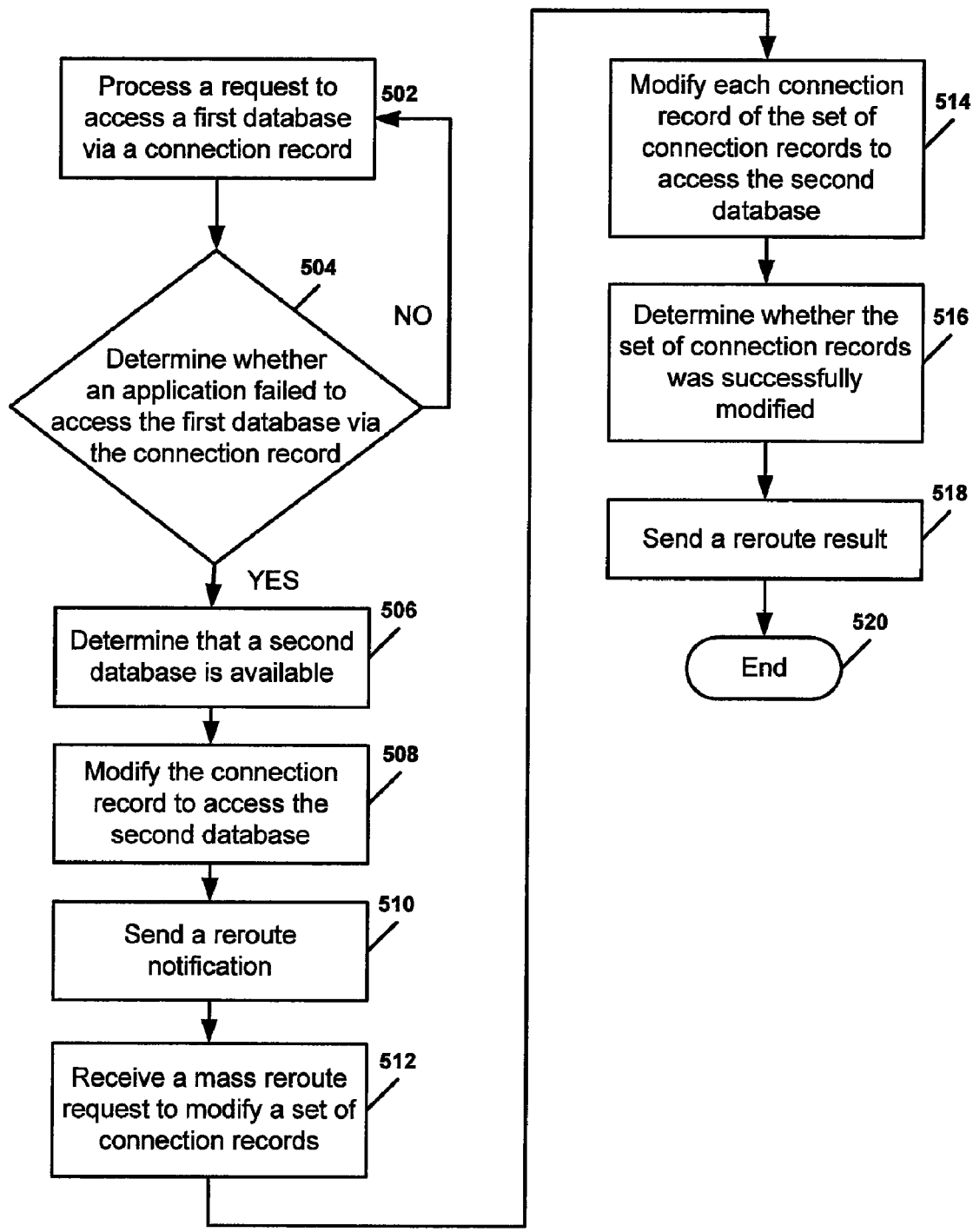
FIG. 5 is a flow diagram of a third illustrative embodiment of a method to modify connection records.

FIG. 5 is a flow diagram of a third illustrative embodiment of a method to modify connection records. The method may be executed by a module, such as the database driver module 130 in FIG. 1 or the database driver module 206 in FIG. 2, and may be implemented as software, firmware, hardware, other form of logic instructions, or any combination thereof. At 502, a request to enable access to a first database via a connection record may be processed. For example, the application 108 of FIG. 1 may request the connection record 140 to access to the first database 110. Continuing to decision 504, a determination may be made whether the application failed to access the first database via the connection record. When, at 504, a determination is made that the application accessed the first database via the connection record, the method may proceed back to 502. When at 504, a determination is made that the application failed to access the first database via the connection record, at 506, the module may determine that a second database is accessible. The second database may be a failover database, such as a backup or mirror database.

Proceeding to 508, the connection record may be modified to enable access to the second database. Advancing to 510, a reroute notification may be sent. The reroute notification may indicate that a connection record to the first database was rerouted by modifying the connection record to enable access to the second database. Continuing to 512, a mass reroute request to modify a set of connection records may be received. For example, the set of connection records 122 in FIG. 1 may be idle connection records in the pool of connection records 120 that have become stale. Moving to 514, each connection record of the set of connection records may be modified to enable access to the second database. Prior to being modified, the set of connection records may enable an application to access the first database and after modification the connection records may be enable the application to access the second database, i.e. the failover database. Advancing to 516, a determination may be made whether the set of connection records was successfully modified. Proceeding to 518, a mass reroute result may be sent. In one illustrative embodiment, the mass reroute result indicates whether the set of connections records was successfully modified. In a second illustrative embodiment, the reroute result indicates which connection records of the set of connection were successfully modified to enable access to the second database. The method may end at 520.

Figure 6:
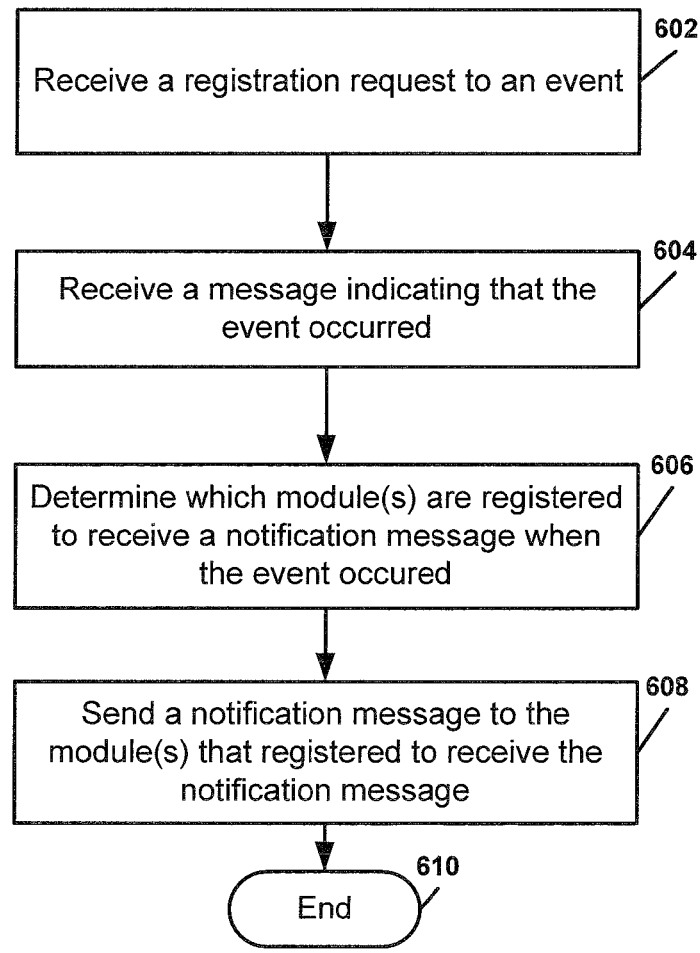
FIG. 6 is a flow diagram of a fourth illustrative embodiment of a method to modify connection records.

FIG. 6 is a flow diagram of a fourth illustrative embodiment of a method to modify connection records. The method may be executed by a module, such as the event listener module 128 in FIG. 1 or the event listener module 204 in FIG. 2, and may be implemented as software, firmware, hardware, other form of logic instructions, or any combination thereof. At 602, a registration request to an event may be received. For example, the event listener module 204 in FIG. 2 may receive the registration request 220 from the connection pool manager module 202. Continuing to 604, a message indicating that the event occurred may be received. For example, the event listener module 204 may receive the event notification message 222 from the database driver module 206 indicating that the connection record 218 to the first database 212 was rerouted to a failover database, such as the second database 214. Advancing to 606, a determination may be made as to which module(s) registered to receive a notification message when the event occurred. For example, the event listener module 204 may determine that the connection pool manager module 202 registered to receive the reroute notification message 224 when a reroute event occurred. Continuing to 608, a notification message may be sent to the module(s) which registered to receive a notification message. For example, the event listener module 204 may send the reroute event notification message 224 to the connection pool manager module 132 indicating that a reroute event occurred. The method may end at 610.

Figure 7:
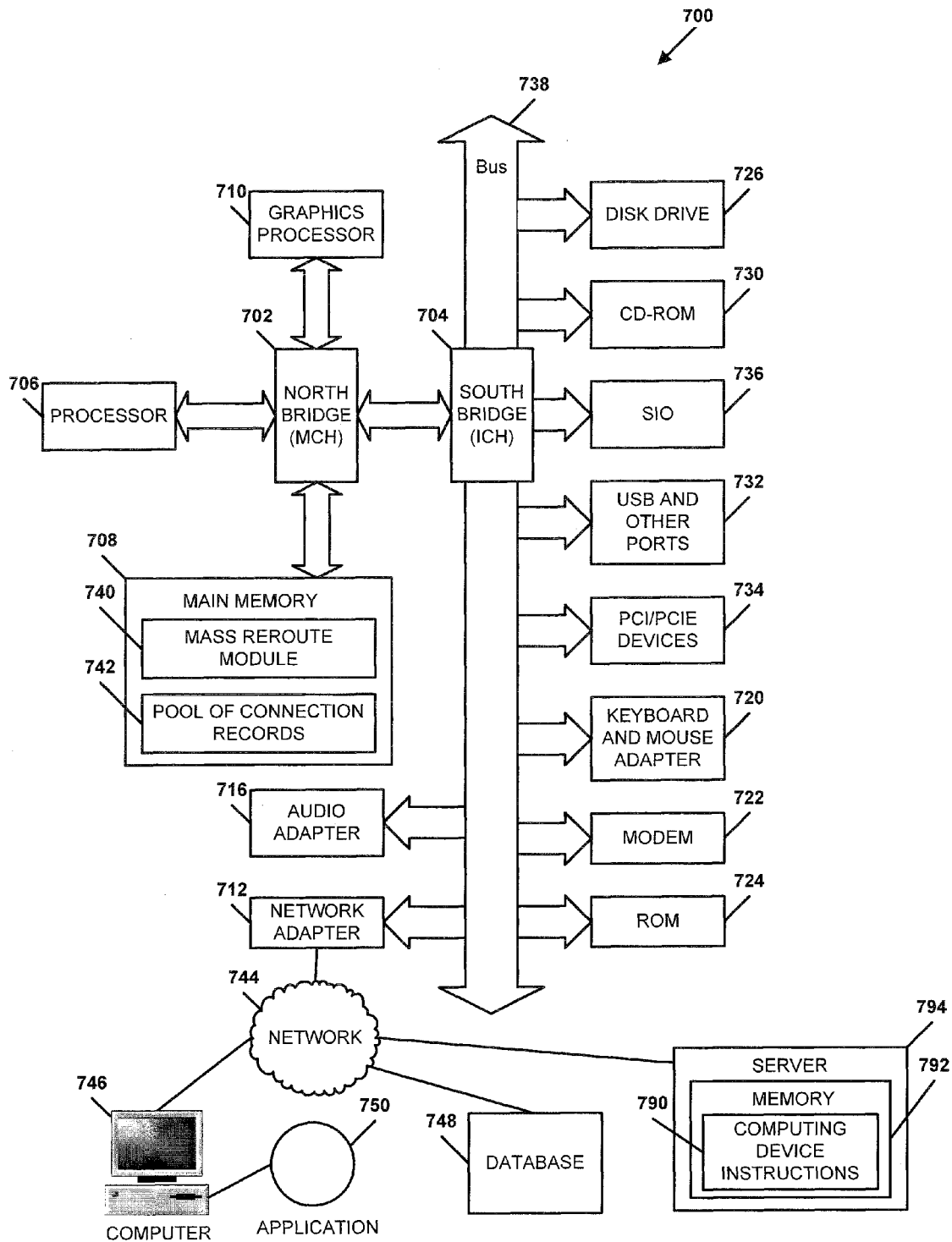
FIG. 7 is a block diagram of a computing system to modify connection records.

FIG. 7 is a block diagram of a computing system in which systems and methods of the present disclosure may be implemented. Computing system 700 includes an example of an application server, such as the application server 104 in FIG. 1, in which computer usable code or instructions are executable to implement the modules 128, 130, and 132 in FIG. 1 and modules 202, 204, and 206 in FIG. 2.

In the depicted example, the computing system 700 employs a hub architecture including a north bridge and memory controller hub (MCH) 702 and a south bridge and input/output (I/O) controller hub (ICH) 704. A processor 706, a main memory 708, and a graphics processor 710 are coupled to the north bridge and memory controller hub 702. For example, the graphics processor 710 may be coupled to the MCH 702 through an accelerated graphics port (AGP) (not shown).

In the depicted example, a network adapter 712 is coupled to the south bridge and I/O controller hub 704 and an audio adapter 716, a keyboard and mouse adapter 720, a modem 722, a read only memory (ROM) 724, universal serial bus (USB) ports and other communications ports 732, and Peripheral Component Interconnect (PCI) and Peripheral Component Interconnect Express (PCIe) devices 734 are coupled to the south bridge and I/O controller hub 704 via bus 738. A disk drive 726 and a CD-ROM drive 730 are coupled to the south bridge and I/O controller hub 704 through the bus 738. The PCI/PCIe devices 734 may include, for example, Ethernet adapters, add-in cards, and PC cards for notebook computers. The ROM 724 may be, for example, a flash binary input/output system (BIOS). The disk drive 726 and the CD-ROM drive 730 may use, for example, an integrated drive electronics (IDE) or serial advanced technology attachment (SATA) interface. A super I/O (SIO) device 736 may be coupled to the south bridge and I/O controller hub 704.

A network 744 is coupled to a computer 746 and a database 748. An application 750 runs on the computer 746. The main memory 708 includes a mass reroute module 740 and a pool of connection records 742. The mass reroute module 740 may be implemented as one or more modules, such as the modules 202, 204, and 206 in FIG. 2. In a particular embodiment, the application 750 and the database 748 are accessible via the network adapted 712. The mass reroute module 740 may implement one or more of the functions of the connection pool manager module 202 in FIG. 2, the event listener module 204, and the database driver module 206. For example, the mass reroute module 740 may be a computer readable program that when executed by the processor causes the processor to detect a failed attempt to access a first database via a connection record, to modify the connection record to enable access to a second database, to identify a set of connection records associated with the first database, and to modify each connection record of the set of connection records to enable access to the second database.

As another example, the mass reroute module 740 may be implemented as a computational component for use in directing one or more computing devices to reroute a set of connections from a database to a failover database. The computational component may comprise encoded computing device instructions 790, emanating from a tangible computer readable medium, such as a memory 792 at a server 794. The encoded computing device instructions 794 are electronically accessible to at least one of the computing devices 700 and 746 for execution. The execution of the encoded computing device instructions 794 may cause the one or more computing devices 700 and 746 to modify a connection record to access a second database instead of a first database to enable access to a second database. The connection record may be modified to include information to route data with respect to the second database. The execution of the encoded computing device instructions 794 may further cause the one or more computing devices 700 or 746 to identify a set of connection records associated with the first database and modify the set of connection records to enable access to the second database. The execution of the encoded computing device instructions 794 may further cause the one or more computing devices 700 and 746 to modify the connection record to enable access to the second database in response to detecting a failure of an application to access the first database via the connection record. The execution of the encoded computing device instructions 794 may further cause the one or more computing devices 700 and 746 to delete connection records of the set of connection records that were not successfully modified. The computational component may be received at the main memory 708 from any of the components 720-736 coupled to the bus 738, or from the computer 746 or the server 790 coupled to the main memory 708 via the network adapter 712, or any combination thereof.

An operating system (not shown) runs on the processor 706 and coordinates and provides control of various components within the computing system 700. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on computing system 700 (Java and all Java-based trademarks are trademarks of Sun Microsystems, Inc. in the United States, other countries, or both).

Instructions for the operating system, the object-oriented programming system, and applications or programs are located on storage devices, such as the hard disk drive 726, and may be loaded into the main memory 708 for execution by the processor 706. The processes of the disclosed illustrative embodiments may be performed by the processor 706 using computer implemented instructions, which may be located in a memory such as, for example, the main memory 708, the read only memory 724, or in one or more of the peripheral devices.

The hardware in computing system 700 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the disclosed illustrative embodiments may be applied to a multiprocessor data processing system.

In some illustrative examples, portions of the computing system 700 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 708 or a cache such as found in the north bridge and memory controller hub 702. A processing unit may include one or more processors or CPUs. The depicted examples in FIG. 7 and above-described examples are not meant to imply architectural limitations. For example, portions of the computing system 700 also may be implemented in a tablet computer, laptop computer, or telephone device in addition to taking the form of a PDA.

Particular embodiments of the computing system 700 can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Further, embodiments of the present disclosure, such as the one or more embodiments in FIGS. 1-7 can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method of modifying a set of connection records, the method comprising:
   determining that an application failed to access a first database via a connection record, wherein the connection record includes data to access the first database;
   determining that a second database is accessible, wherein the second database is a failover database to the first database;
   modifying a set of connection records associated with the first database to enable access to the second database;
   identifying a connection record that was not successfully modified to enable access to the second database; and
   deleting the connection record that was not successfully modified.

2. The method of claim 1, further comprising modifying the connection record to enable access to the second database before modifying the set of connection records, wherein modifying the connection record enables the application to continue processing substantially without interruption.

3. The method of claim 1, wherein each connection record in the set of connection records is modified to enable access to the second database in response to determining that the application failed to access the first database via the connection record.

4. The method of claim 3, wherein modifying each connection record of the set of connection records to enable access to the second database is performed substantially concurrently.

5. The method of claim 1, wherein before modifying the set of connection records to enable access to the second database, at least one connection record in the set of connection records is identified as not currently in use.

6. A computer program product comprising a non-transitory computer usable medium including a computer readable program, wherein the computer readable program when executed by a computer causes the computer to:
   detect a failed attempt to access a first database via a connection record;
   modify the connection record to enable access to a second database;
   identify a set of connection records associated with the first database;
   modify each connection record of the set of connection records to enable access to the second database; and
   delete at least one modified connection record from the set of connection records, wherein the at least one deleted modified connection record was not successfully modified to enable access to the second database.

7. The computer program product of claim 6, wherein one or more connection records from the set of connection records are used by an application to enable access to the second database after each connection record of the set of connection records is modified to enable access to the second database.

8. The computer program product of claim 6, wherein the connection record is modified to enable access to the second database after determining that the second database is accessible.

9. A system, comprising:
a database driver module adapted to:
determine that a second database is accessible after detecting a failed attempt to access a first database via a connection record;
modify the connection record to enable access to the second database;
modify each connection record of a set of connection records associated with the first database to enable each connection record to enable access to the second database, wherein at least one connection record of the set of connection records is identified as currently not in use; and
delete at least one modified connection record from the set of connection records, wherein the at least one deleted modified connection record was not successfully modified to enable access to the second database.

10. The system of claim 9, further comprising:
a connection pool manager module to:
identify the set of connection records associated with the first database before the database driver module modifies the set of connection records to enable access to the second database.

11. The system of claim 9, wherein the database driver module is adapted to send a message to the connection pool manager module, wherein the message indicates whether each connection record of the set of connection records was successfully modified.

12. The system of claim 11, wherein further comprising:
an event listener module to:
receive from the database driver module a message indicating that an event occurred; and
send an event notification message to the connection pool manager module that the event occurred.

13. A method, comprising:
receiving a reroute notification that a connection record was modified to enable the connection record to enable access to a second database instead of a first database, wherein the second database comprises a failover database to the first database;
identifying a set of other connection records associated with the first database;
sending a mass reroute request to modify the set of other connection records;
receiving a mass reroute result identifying connection records that were not successfully modified; and
deleting the connection records that were not successfully modified.

14. The method of claim 13, wherein at least one connection record of the set of other connection records has an idle status, and wherein the at least one connection record with the idle status is not in use by an application.

15. The method of claim 13, wherein the reroute notification that the connection record was modified to enable access to a second database.

16. The method of claim 15, wherein the mass reroute request identifies the set of other connection records to be modified to enable access to the second database.

17. A non-transitory computational component for use in directing one or more computing devices to reroute a set of connections from a database to a failover database, the computational component comprising encoded computing device instructions emanating from a tangible computer readable medium, the encoded computing device instructions electronically accessible to at least one of the one or more computing devices for execution, the execution causing the one or more computing devices to:
modify a connection record to access a second database instead of a first database to enable access to a second database, wherein the connection record is modified to include information to route data with respect to the second database;
identify a set of connection records associated with the first database;
modify the set of connection records to enable access to the second database; and
delete connection records of the set of connection records that were not successfully modified.

18. The computational component of claim 17, wherein the execution of the encoded computing device instructions further causes the one or more computing devices to modify the connection record to enable access to the second database in response to detecting a failure of an application to access the first database via the connection record.

* * * * *